United States Patent

Bol et al.

[15] 3,646,352
[45] Feb. 29, 1972

[54] METHOD OF MEASURING THE CONCENTRATION AND/OR SIZE OF SUSPENDED PARTICLES BY FORWARD SCATTERING OF LIGHT

[72] Inventors: Jan Bol, Kelkheim; Werner Heinze; Josef Gebhardt, both of Frankfurt; Werner Letschert, Oberstedten, all of Germany

[73] Assignee: Bundesminister fur Wissenshaftliche Forschung, Bonn, Germany

[22] Filed: Oct. 10, 1969

[21] Appl. No.: 865,404

[30] Foreign Application Priority Data

Oct. 10, 1968 Germany..................P 18 02 269.0

[52] U.S. Cl..............................250/218, 356/102, 356/103
[51] Int. Cl.......................................................G01n 21/26
[58] Field of Search................356/102, 103, 210, 207, 208; 250/218, 222

[56] References Cited

UNITED STATES PATENTS

| 3,389,259 | 6/1968 | Zarem | 250/201 |
| 3,418,479 | 12/1968 | Schmitt | 356/223 X |
| 3,451,755 | 6/1969 | Silverman | 356/103 X |
| 3,515,482 | 6/1970 | Garrow | 356/103 |
| 3,528,742 | 9/1970 | Dobbs | 356/103 |

OTHER PUBLICATIONS

German Printed Application: 1,115,477 Stetter et al. 8–4–60.

DeSilva, A. W.; et al. " Observation of Thompson and Cooperative Scattering of Ruby Laser Light by a Plama," Nature, Vol. 203, No. 4952 pp. 1321– 22, 8– 26– 64.

George, T. V., et al. " Scattering of Ruby Laser Beam by Glasses," Physical Review Letters, Vol. 11, No. 9, 11– 63, pp. 403– 5.

Kratohvil, J. P., " Light Scattering," Analytical Chemistry, Vol. 36, No. 5, April 1964, pp. 458R– 72R.

Woodward, P. H., " He– Ne Laser as Source for Light Scattering Measurements," Applied Optics, Vol. 2, No. 11, Nov. 1963, pp. 1205– 07.

Primary Examiner—James W. Lawrence
Assistant Examiner—D. C. Nelms
Attorney—Spencer & Kaye

[57] ABSTRACT

A method for measuring the concentration and/or size of illuminated particles suspended in a gas by means of the scattered light process. The suspended particles are illuminated by passing them through a focused laser beam in the vicinity of its focal plane. The light that is scattered from the particles in the direction of propagation of the laser beam within an angle of ±15° with respect to the focal line of the laser beam are then evaluated by a photodetector device to determine the desired parameter. The intensity of the laser beam is reduced if the anode current of the photodetector exceeds a preset limit. The output signal of the photodetector device is fed to a potentiometer which has a logarithmic resistance per unit of its length. The output of the potentiometer is fed to a fixed single channel pulse height analyzer, which records all the pulses above a predetermined threshold value and transmits them to a counter.

7 Claims, 2 Drawing Figures

METHOD OF MEASURING THE CONCENTRATION AND/OR SIZE OF SUSPENDED PARTICLES BY FORWARD SCATTERING OF LIGHT

BACKGROUND OF THE INVENTION

The invention relates to a method for measuring the concentration and/or size of illuminated suspended particles by the scattered light technique.

For measuring the concentration and/or size of suspended particles, equipment has been on the market for a long time which operates by the scattered light technique and supplies measured results very quickly. In these devices, the intensity of the light scattered by the particles acts as a measure of the particle size and the number of counts per unit time is a measure of the concentration. However, closer examination shows that these results contain errors, because the readings depend upon the optical qualities of the particles to be investigated. This is a disadvantage especially when aerosols with particles which differ with respect to their optical qualities are to be investigated; i.e., so-called mixed aerosols.

The calibration curves supplied along with this equipment, moreover, refer only to spherical particles, whereas investigations of technical dust must be performed mostly on completely irregular particles. This form factor is not taken into account at all by the familiar equipment.

SUMMARY OF THE INVENTION

The purpose of the present invention is to create a method of the type mentioned initially which enables the measurement of the concentrations and/or size of suspended particles in a comparatively large range of particle sizes and concentrations. The suspended particles in this case are to have diameters between 0.1 and 10 $\mu$m; their concentration in the carrier medium is to be between 0 and $10^4$ particles per cm$^3$. Moreover, the measured results are to be practically independent of the optical qualities (refraction index, absorptivity) and the form of the particles.

In the present invention, the problem has been solved in such a way that the suspended particles are illuminated by a laser beam and that the forward lobe of the scattering light is evaluated within an angle of ±15°. The laser beam is focused and the suspended particles are caused to pass through the focused laser beam in the area of the focal line.

The use of a laser beam in the present invention establishes the precondition for evaluation of only the light scattered within the forward lobe. The intensity of the light scattered in the small angle area of the forward lobe is influenced least by the optical qualities of the suspended particles. In addition, the generally irregular form of the suspended particles within the angular area of the forward lobe has the smallest influence on the measure result. In this way, an exact dererrmination of the quantities to be measured is safeguarded.

The increase in accuracy and range of measurement of the method according to the invention achieved through the use of a laser beam is due to the following qualities of laser light:

The intensity of illumination is comparatively high. This increases the sensitivity and allows small particles to be detected. The point characteristics of the focused laser as a light source permit the exact illumination of a relatively very small measured volume, i.e., it is possible to measure high aerosol concentrations. The laser beam has a small angle of aperture. In this way, a small illumination aperture in the measurement volume can be achieved which, in turn, provides an exact definition of the forward lobe, or area of narrow forward scattering, and permits a clean separation of the unscattered from the scattered light.

In order to be able to process in a conventional secondary electron multiplier the intensity of the scattered light, which covers eight powers of 10, in the envisaged range of particle sizes between 0.1 and 10 $\mu$m and above, it is provided for in the present invention to reduce the intensity of the laser beam when the anode current of the photo detector exceeds a preset limit.

In the present invention, this reduction of intensity of the laser beam is achieved by triggering a Kerr or Pockel cell set up in the laser beam by the anode of the photo detector.

DESCRIPTION OF THE PREFERRED EMBODIMENT

Figure 1:
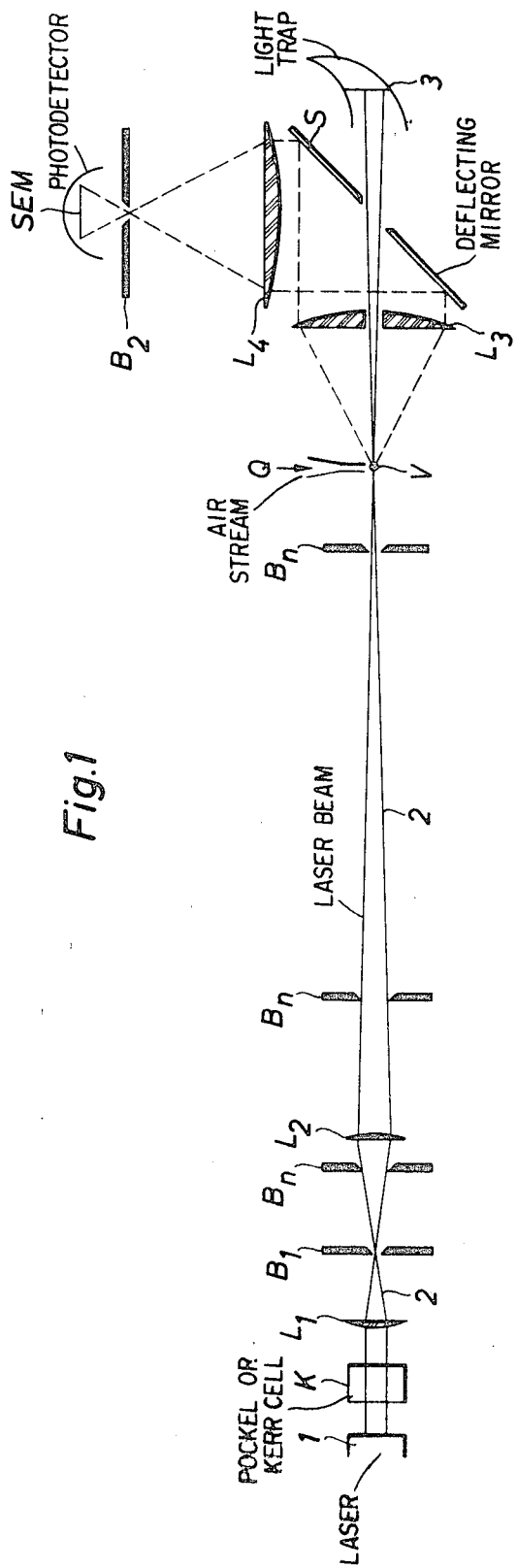
FIG. 1 shows schematically the beam path of the beam in an optical particle spectrometer for execution of the method according to the present invention.

A laser beam 2 emerging from a laser 1 acting as a light source is propagated from left to right in FIG. 1 and focused onto a disk diaphragm $B_1$ by means of a lens $L_1$. The disk diaphragm $B_1$ in turn is enlarged by a lens $L_2$ and imaged astigmatically. In a measurement volume V, the laser beam 2 is focused to a focal point defining a focal plane line. The distance between the measurement volume V and the lens $L_2$ should be as large as possible. Additional diaphragms $B_n$ are set up between the disk diaphragm $B_1$ and the measurement volume V along the path of propagation of beam 2. In this way, the measurement volume V is shielded from the deflected light at the disk diaphragm $B_1$ and the scattered light of the lens $L_2$.

Particles carried along in a test air stream Q pass through the laser beam 2 in the measurement volume V, giving off a pulse of scattered light. Of this scattered light, the fraction occuring in the narrow forward range is recollected by lenses $L_3$ and $L_4$, the respective scattering particle being imaged in a disk diaphragm $B_2$. The scattered light penetrating through the disk diaphragm $B_2$ reaches a photodetector SEM. It supplies an electric signal which is proportional to the intensity of the scattered light. The particle size thus results from the relationship between the intensity of scattered light detected and the particle size $d$ not shown.

After the measured volume V, the nonscattered direct laser beam 2 passes through clearances in a lens $L_3$ and a deflecting mirror S to reach a light trap 3 and in, this way, is separated from the path of the beams imaging the particles. Usually, the signal at the photo detector is directly fed into a multichannel pulse analyzer with a linear subdivision of channels. This results in a greatly distorted scale for the particle size $d$, which is adapted to the resolution of the particle size spectrometer and not over the entire recorded range of particle sizes.

Figure 2:
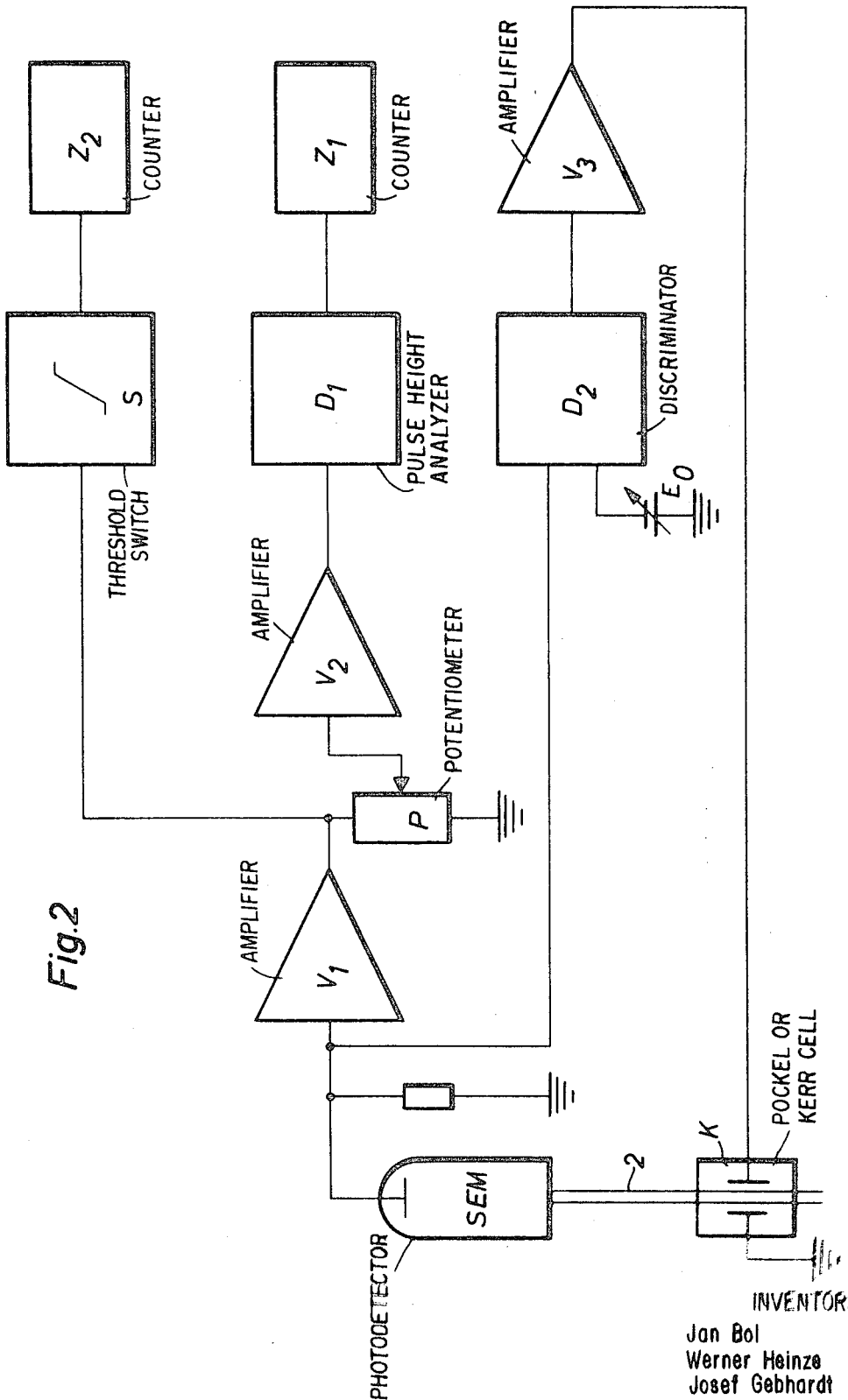
FIG. 2 shows a block diagram of the electrical evaluation system arranged after the secondary electron multiplier of FIG. 1 and of the triggering of a Kerr or Pockel cell set up in the laser beam.

This disadvantage is avoided by simple means in the method according to the present invention. According to FIG. 2, the signal voltage of the photo detector SEM is divided after amplification in an amplifier $V_1$ and passed through a potentiometer P having logarithmic resistance per unit length. The voltage at the tap of the potentiometer P is fed through an amplifier $V_2$ to a fixed single channel pulse height analyzer $D_1$. This records all the pulses with a voltage $E\pm\Delta E$ and transmits them to a counter $Z_1$. At each position of the tap of the potentiometer P, a specific particle size $d$ is registered. On the basis of the familiar relationship between the intensity of the light of an illuminated particle scattered into the narrow forward lobe and the particle size $d$, the tap of the potentiometer P in the different ranges of size can then be calibrated in term of particle sizes with the respective logarithmic scale.

All pulses occuring at the output of the amplifier $V_1$ are separated from the noise background by a threshold switch S and fed to a counter $Z_2$. In this way, the concentration of the aerosol to be analyzed is determined and controlled.

Since the intensity of the scattered light changes with the fourth to sixth power of the particle diameter $d$, the photo detector would be overloaded by the passage of the largest occurring particles through the measurement volume. To avoid this, the intensity of the laser beam 2, which has been polarized from the outset, is reduced by a Pockel or Kerr cell K controlled by the output of the photo detector when the photo current exceeds an adjustable setting. For this purpose, the signal is collected at the output of the photodetector SEM and compared with a preselectable voltage $E_o$ by means of a discriminator $D_2$. If the voltage derived from the photo detector exceeds this voltage $E_o$, a Pockel or Kerr cell is triggered by an amplifier $V_3$ in such a way that the intensity of the laser beam 2 is reduced in the well-known manner. For this purpose, the Kerr cell K is set up in the laser beam 2.

The rise of a signal at the photodetector occurs over a period of a few microseconds; by contrast, a Pockel or Kerr cell is able to switch within a period shorter than 0.1 microsecond so that the desired protection from overloading of the photodetector and, especially of the photo cathode is safeguarded. This overload protection is activated only for particles above some 10 $\mu$m.

We claim:

1. A method for measuring both separately and simultaneously the concentration and size of suspended particles, comprising the steps of:
    a. illuminating the particles by passing them through a focused laser beam at a point substantially in a focal plane defined by the laser beam; and
    b. detecting substantially all of the light scattered from the laser beam by the particles and substantially none of the unscattered light within an angle of ±15° with respect to the direction of propagation of the laser beam.

2. The method of claim 1, wherein said detecting step includes the step of detecting the scattered light with a photodetector and reducing the intensity of the laser beam if the anode current of the photodetector exceeds a predetermined value.

3. The method of claim 2, further including the step of triggering a Kerr cell to reduce the intensity of the laser beam.

4. The method of claim 2, further including the step of triggering a Pockel cell to reduce the intensity of the laser beam.

5. The method of claim 2, wherein the detecting step further includes the step of feeding the output of the photodetector to a potentiometer having logarithmic resistance per unit of its length.

6. The method of claim 5, wherein the detecting step further includes the step of feeding the output of the potentiometer to a fixed single channel pulse height analyzer.

7. The method of claim 6, wherein the potentiometer has a tap, and is calibrated in particle sizes with a logarithmically subdivided scale, and the feeding from the potentiometer is at the tap.

* * * * *

UNITED STATES PATENT OFFICE
CERTIFICATE OF CORRECTION

Patent No. 3,646,352                    Dated February 29th, 1972

Inventor(s) Jan Bol, Werner Heinze, Josef Gebhardt, Werner Letschert

It is certified that error appears in the above-identified patent and that said Letters Patent are hereby corrected as shown below:

In the heading of the patent, line 8, change "Wissenshaftliche" to --wissenschaftliche--. Column 1, line 6, after "The" insert --present--.

Signed and sealed this 3rd day of October 1972.

(SEAL)
Attest:

EDWARD M. FLETCHER, JR.                 ROBERT GOTTSCHALK
Attesting Officer                       Commissioner of Patents